(12) United States Patent
Boese

(10) Patent No.: US 6,419,093 B2
(45) Date of Patent: Jul. 16, 2002

(54) VEGETABLE HARVESTER

(76) Inventor: Gregory M. Boese, 4730 Sheridan Rd., Saginaw, MI (US) 48601

( * ) Notice: Subject to any disclaimer, the term of this patent is extended or adjusted under 35 U.S.C. 154(b) by 0 days.

(21) Appl. No.: 09/760,920

(22) Filed: Jan. 16, 2001

Related U.S. Application Data

(62) Division of application No. 09/404,617, filed on Sep. 23, 1999, now Pat. No. 6,199,703, which is a division of application No. 08/936,453, filed on Sep. 24, 1997, now Pat. No. 6,003,293.
(60) Provisional application No. 60/026,921, filed on Sep. 25, 1996.

(51) Int. Cl.⁷ ............................................. B07B 13/05
(52) U.S. Cl. ........................ 209/670; 209/673; 56/327.1
(58) Field of Search ................................. 209/659, 660, 209/667, 670, 673; 56/119, 327.1

(56) References Cited

U.S. PATENT DOCUMENTS

| | | | |
|---|---|---|---|
| 2,285,678 A | | 6/1942 | Overstrom et al. |
| 2,477,006 A | * | 7/1949 | Pierson .................... 209/673 X |
| 2,874,528 A | | 2/1959 | Esch |
| 2,966,263 A | | 12/1960 | Holmes |
| 3,200,888 A | | 8/1965 | Lehde et al. |
| 3,770,123 A | * | 11/1973 | Mraz ...................... 209/670 X |
| 4,249,366 A | | 2/1981 | Dolberg et al. |
| 4,257,217 A | | 3/1981 | McClendon |
| 4,257,218 A | | 3/1981 | McRobert |
| 4,339,906 A | | 7/1982 | Chichkin et al. |
| 4,340,070 A | | 7/1982 | Keitel |
| 4,385,702 A | | 5/1983 | Lenker et al. |
| 4,395,867 A | | 8/1983 | Cooper et al. |
| 4,402,175 A | | 9/1983 | Watenpaugh |
| 4,471,876 A | * | 9/1984 | Stevenson, Jr. et al. 209/673 X |
| 4,507,911 A | | 4/1985 | Wolf et al. |
| 4,697,406 A | | 10/1987 | Whitley |
| 4,739,608 A | | 4/1988 | Arnold |
| 4,757,673 A | | 7/1988 | Gayman |
| 5,210,999 A | | 5/1993 | Cosimati |
| 5,287,687 A | | 2/1994 | Urich et al. |
| 5,329,753 A | | 7/1994 | Arnold et al. |
| 5,375,403 A | | 12/1994 | Collins |
| 5,444,968 A | | 8/1995 | Barton |
| 5,784,869 A | | 7/1998 | Rayfield |

FOREIGN PATENT DOCUMENTS

| | | | |
|---|---|---|---|
| DE | 4201067 | 7/1993 | |
| EP | 0450290 | 10/1991 | |
| EP | 584965 A1 | 3/1994 | |
| SU | 858632 | 8/1981 | |
| SU | 888845 | 12/1981 | |
| SU | 897153 | 1/1982 | |
| SU | 1242027 | 7/1986 | |
| SU | 1323020 | 7/1987 | |
| SU | 1516048 | 10/1989 | |
| SU | 2004953 | 12/1993 | |
| WO | 83/02408 | * 7/1983 | ................. 209/673 |

* cited by examiner

Primary Examiner—Tuan N. Nguyen
(74) Attorney, Agent, or Firm—Reising, Ethington, Barnes, Kisselle, Learman & McCulloch, P.C.

(57) ABSTRACT

The harvester has a harvesting head, a shredder, cleaning and separating assemblies including a roller bed, a fruit sizer and a fruit discharge. The roller bed includes a plurality of parallel rollers journaled on a roller bed frame. The roller bed frame is pivoted relative to the harvester frame to control the rate of movement of crop material in an axial direction relative to the rollers. Nips are formed between the rollers. A bar is supported by the roller bed frame directly above each nip in a position parallel to the adjacent nip. These bars are vertically adjustable toward and away from the nips to accommodate different sizes and shapes of fruit and to keep two rollers from simultaneously engaging one fruit. A reversible drive rotates adjacent rollers in opposite directions to separate leaves and stems from the fruit.

7 Claims, 13 Drawing Sheets

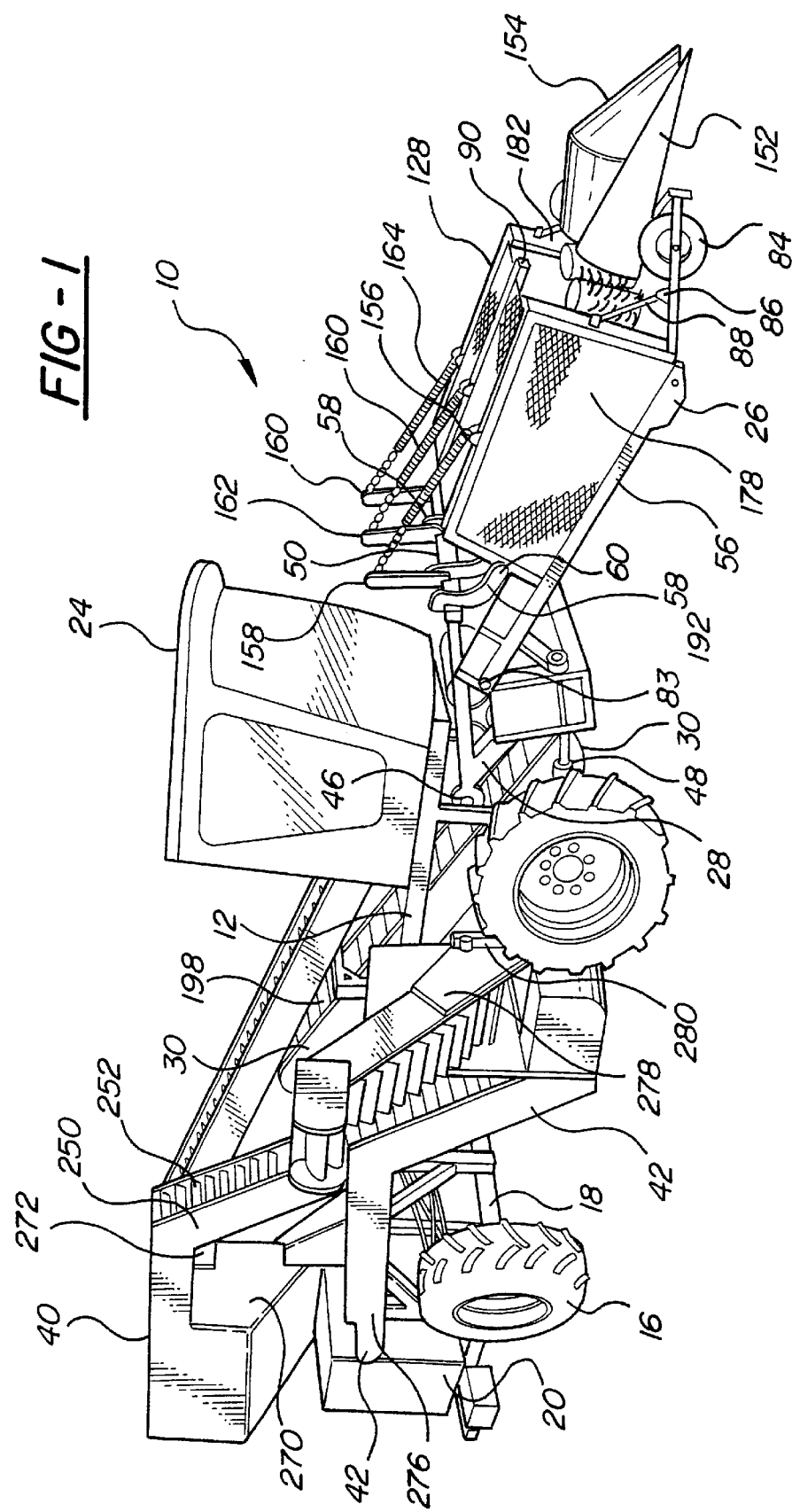

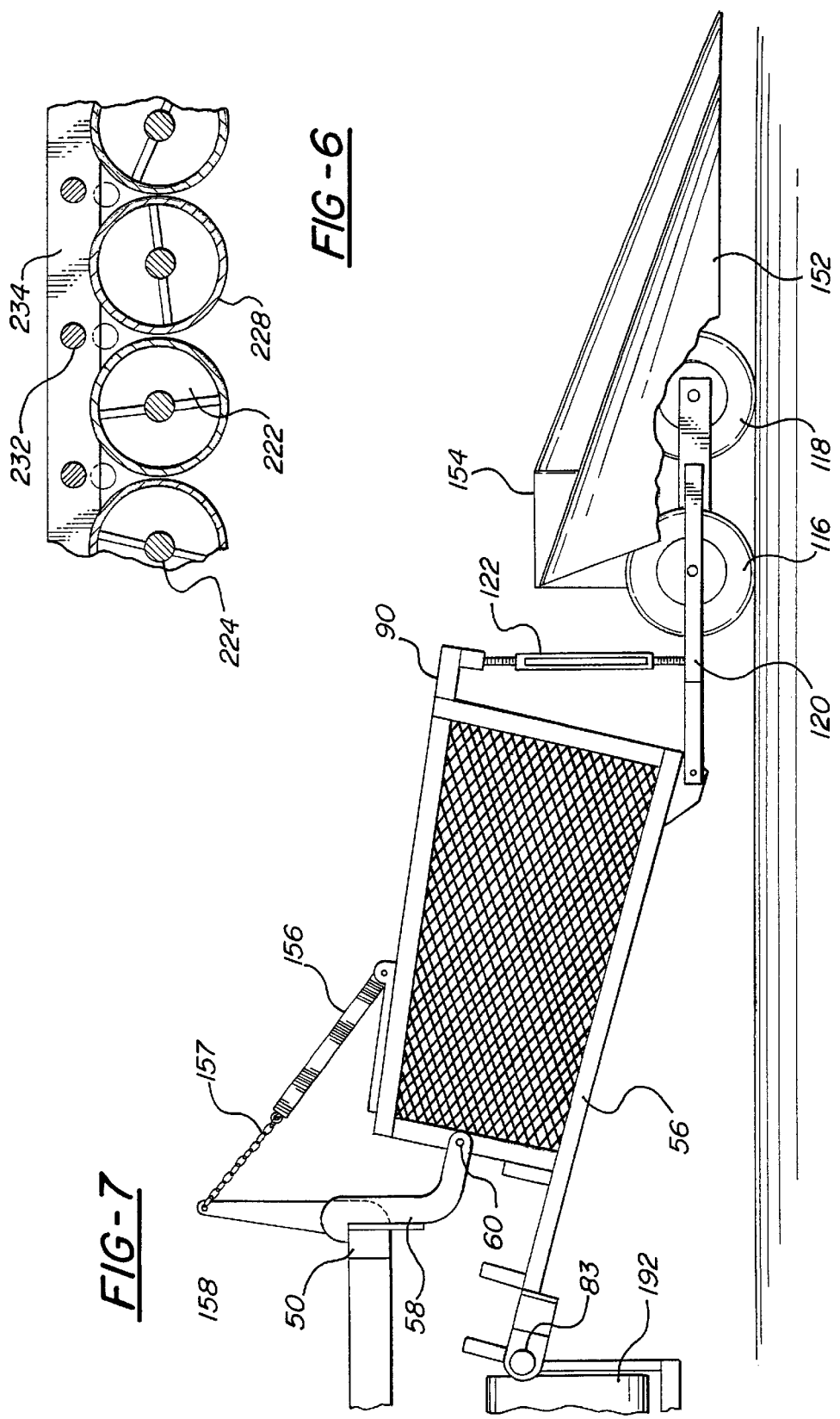

VEGETABLE HARVESTER

This is a divisional application of Ser. No. 09/404,617, filed Sep. 23, 1999, now U.S. Pat. No. 6,199,703, which is a divisional of Ser. No. 08/936,453, filed Sep. 24, 1997, now U.S. Pat. No. 6,003,293, which claims benefit to Provisional Application No. 60/026,921 filed Sep. 25, 1996.

BACKGROUND OF THE INVENTION

1. Technical Field

This invention relates to a vegetable harvester and more particularly to a harvester for harvesting podlike fruit of low bush like plants.

2. Description of the Prior Art

The fruit of many plants is harvested by hand pickers today even though there have been numerous attempts to mechanize their harvesting. The attempts to mechanize their harvest have been unsuccessful for many different reasons. As a result, large numbers of hand pickers are required to harvest some vegetable crops. Hand harvesting is hard work that many people refuse to do. Farmers are not therefore assured of having the required number of people at the right time to harvest their crops. Hand harvesting of vegetables is generally slow, making it expensive. Crops which are harvested by hand today are often too expensive to compete with similar crops that can be harvested by machines.

Attempts to mechanize the harvesting of some crops have failed as stated above. The reasons for failures include the inability of a machine to accommodate the growing conditions, failure to separate the desired fruit from the plant, unacceptable plant damage, unacceptable fruit damage, unacceptable levels of plant and foreign material mixed with the fruit and low machine capacity or reliability.

Several different individuals have attempted over the years to make a harvester that is acceptable for harvesting podlike fruits such as peppers. These efforts have had very limited success. There were no commercially acceptable pepper harvesters before the harvester disclosed below was developed.

SUMMARY OF THE INVENTION

An object of the invention is to provide a commercially acceptable harvester for harvesting podlike fruit such as peppers growing in spaced apart rows. Another object of the invention is to provide a harvester that selectively harvests mature podlike fruits such as peppers and leaves immature fruit on the plant to grow and be harvested at a later time. A further object of the invention is to provide a harvester that separates leaves, stems and other foreign material from podlike fruit such as peppers after the fruit has been harvested. A yet further object of the invention is to provide a harvester, which harvests podlike fruit, that has a high capacity.

The harvester for harvesting podlike fruit has a head that includes at least one row unit with a pair of driven helix assemblies. Growing plants are fed into a slot between the pair of helix assemblies, as the harvester advances along a row of plants, by fingers that extend radially from a pair of generally vertical drive shafts. These fingers protrude through slots in fixed drums.

The driven helix assemblies are driven in a timed relationship relative to each other in opposite directions so that the helical bars move in an upward direction when they are closest to the base of the plants being harvested. Wheels, that roll along the ground adjacent to both sides of the row of plants being harvested support the forward ends of the helix assemblies. The rear portions of the helix assemblies are pivotally attached to the harvester for pivotal movement about a horizontal transverse axis that allows the forward end of one helix assembly to move up and down relative to the other helix assembly.

Conveyor troughs are provided on both sides of each pair of helix assemblies to catch fruit separated by the helix assemblies. Conveyors in conveyor troughs convey fruit to the rear. These conveyors deposit the fruit and other plant material in a primary elevator. A shredder can be provided to shred crop material other than fruit that is conveyed from the harvesting head.

The primary elevator conveys the fruit and other plant material up and to the rear. A stream of high velocity air passes through the fruit as it falls from the discharge end of the primary elevator. This high velocity air separates some leaves and light trash which is then directed toward the ground. Fruit and mixed plant material falls from the primary elevator onto the upper end of an inclined parallel roller cleaning bed.

The inclined parallel roller cleaning bed has a plurality of driven rollers with rubber covers. Adjustable bars above the nip between adjacent rollers holds fruit away from the nip. Plant material such as leaves and stems is pulled into the nips as the fruit moves parallel to the axis of rotation of the rollers. The plant material pulled into the nips is pulled from the fruit and discharged toward the ground. A brush beater conveys fruit from the discharge end of the cleaning bed.

A secondary elevator assembly receives fruit and any remaining plant material mixed with the fruit and elevates the fruit to a sizer. The sizer shakes the fruit and allows any remaining trash and small immature fruit to separate and fall to the ground. Cleaned mature fruit is delivered to a sorting bed by the sizer.

The sorting bed is used for hand sorting the fruit. People stand at the side of the sorting bed, visually observe the harvested and cleaned fruit and manually remove fruit that is unacceptable for any reason. Following sorting, the cleaned and sorted fruit is delivered to an elevating conveyor system. The elevating conveyor system elevates the fruit and deposits the fruit in a storage bin for temporary storage. When the bin is filled, a bin discharge conveyor system discharges the fruit into a vehicle carried container or into storage containers that can be handled mechanically.

BRIEF DESCRIPTION OF THE DRAWINGS

The foregoing and other objects, features and advantages of the present invention will become apparent in light of the following detailed description of an exemplary embodiment thereof as illustrated in the accompanying drawings:

FIG. 1 is a perspective view of the harvester;

FIG. 6 is an enlarged cross sectional view of a portion of the roller bed;

FIG. 7 is an enlarged side elevational view of the wheels supporting the forward end of the center helix assemblies and the plant dividers with parts broken away and parts removed;

DESCRIPTION OF THE PREFERRED EMBODIMENT

Figure 3:
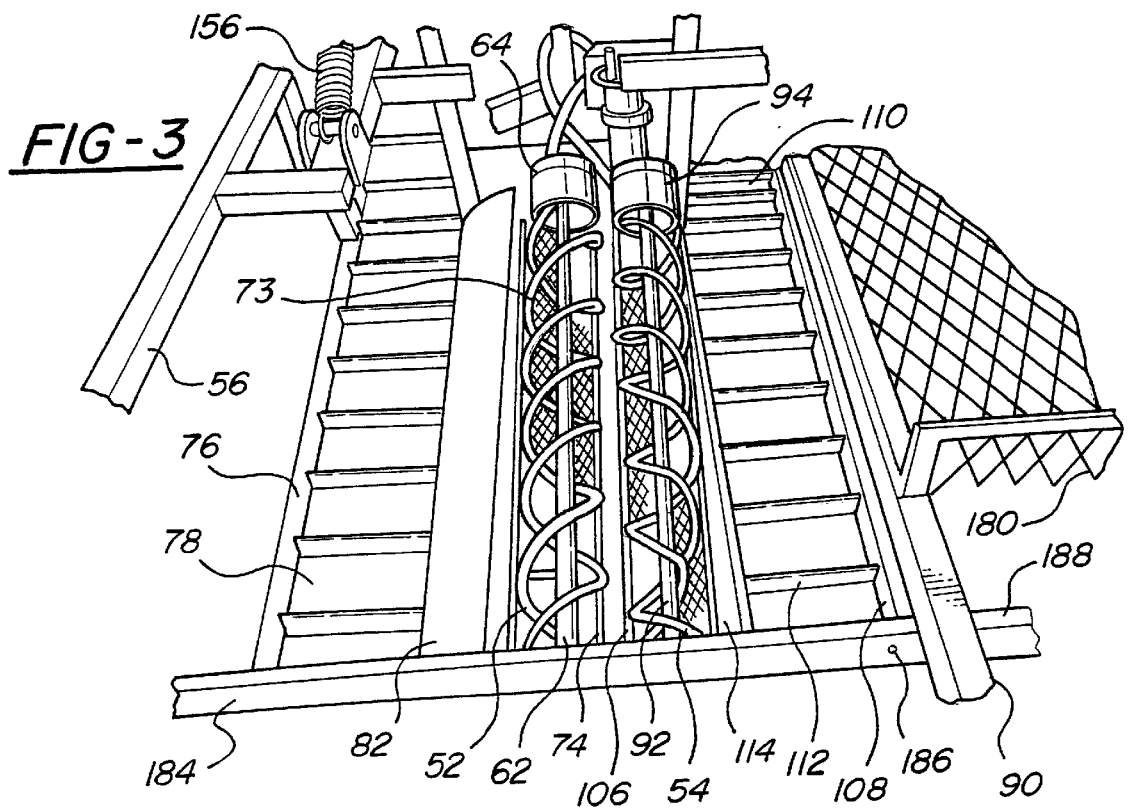
FIG. 3 is a perspective view of the rear portion of two helix assemblies.

The vegetable harvester 10 was designed to harvest peppers. It has been found that with minor adjustments or alterations it can harvest other vegetable crops. For convenience it will be referred to as a pepper harvester even though the machine is not limited to harvesting peppers.

The harvester 10 has a main frame 12 supported by driven front wheels 14 and driven and steered rear wheels 16. The rear axle 18 oscillates about a horizontal fore and aft axis. The engine, which is in an engine compartment 20 behind the rear axle 18, drives a hydraulic pump 22. The hydraulic pump 22 supplies hydraulic fluid under pressure to hydraulic motors that drive the wheels 14 and 16 and harvesting, conveying and cleaning components of the harvester 10. An operator's cab 24 is mounted on an upper forward portion of the frame 12.

A two row harvesting head 26 is pivotally mounted on a row unit support frame 28 on the front of the harvester 10. The harvesting header 26 could be constructed to simultaneously harvest one, two, three, four or more rows if desired.

A primary elevator 30 conveys harvested peppers to cleaning assemblies. The cleaning assemblies can include a shredder, a high volume air separator 32, a roller bed 34 for stem and leaf removal, a sizer 36 or 500, and a hand sorting bed 38. Cleaned and sorted peppers are conveyed to a storage bin 40. A discharge conveyor system 42 discharges fruit from the bin 40 into a transport container.

The harvesting head 26 includes a row unit support frame 28 pivotally attached to the main frame 12 by pivot 46. Hydraulic cylinders 48 pivot the frame 28 relative to the main frame 12. The frame 28 includes an integral tool bar 50. Two helix assemblies 52 and 54 are required to harvest one row of peppers. The helix assembly 52 is rotatably supported on an outside frame 56 that is pivotally attached to support arms 58 by pin 60. The support arms 58 are clamped to the tool bar 50. The helix assembly 52 includes a central shaft 62 that is pivotally supported by a rear bearing 64 and a front support arm 66. Two helix shaped rods 68 are attached to the central shaft 62 by arms 70 that extend radially from the central shaft 62. A conical member 72 is attached to the forward end of the central shaft 62 and rotates with the shaft. An expanded metal grate 73, with an edge member 74, is mounted on the outside frame 56 under the helix assembly 52. Edge member 74 defines one side of a plant receiving slot. A conveyor trough 76 is an integral part of the outside frame 56. An endless rubber conveyor belt 78 with integral upstanding flights 80 is trained around rollers supported by shafts 81 and 83 and convey peppers, that have been separate from a plant, to the rear and upward. A plate 82 guides severed peppers down onto the belt 78 and extends from an edge of expanded metal grate 73 opposite the edge member 74 to the conveyor trough 76.

A support wheel 84 is journaled on an arm 86 that is pivotally attached to the front portion of the outside frame 56. An adjustable strut 88 holds the arm 86 in a fixed position relative to the outside frame 56. As the harvester 10 moves forward through the field, the support wheel 84 follows the surface of the ground and the outside frame 56 pivots up and down about the axis of the pin 60. The strut 88 is shortened to move the conical member 72 downward toward the ground and is lengthened to raise the conical member up away from the ground.

An inside frame 90 is pivotally attached to support arms 58 by pin 60. These support arms 58 are also clamped to the tool bar 50. A helix assembly 54 includes a central shaft 92 that is pivotally supported on the inside frame 90 by a rear bearing 94 and a front support arm 96. Two rods 98 formed into helical shapes are attached to the central shaft 92 by arms 100 that extend radially outward from the central shaft 92. A conical member 102 is attached to the forward end of the central shaft 92 and rotates with the shaft. An expanded metal grate 104, with an edge member 106, is mounted on the inside frame 90 under the helix assembly 54. The edge member 106 cooperates with the edge member 74 to define both side of a plant receiving slot. A conveyor trough 108 is an integral part of the inside frame 90. An endless rubber conveyor belt 110 with integral upstanding flights 112 is trained around rollers at both end of the conveyor trough 108 and conveys peppers, that have been separated from plants, to the rear and upward. A plate 114 guides severed peppers down onto the belt 110 and extend from an edge of the expanded metal grate 104, opposite the edge member 106, to the conveyor trough 108.

Two support wheels, 116 and 118, as shown in FIG. 7, are journaled on an arm 120 that is pivotally attached to the front portion of the inside frame 90. An adjustable length strut 122 hold the arm 120 in a fixed position relative to the inside frame 90. The two support wheel 116 and 118, with one in front of the other, allow the head 26 to cross transverse irrigation ditches. The strut 122 is shortened to move the conical member 102 downward toward the ground and is lengthened to raise the conical member up away from the ground. If there are no transverse irrigation ditches, only one support wheel is required on the arm 120.

There is a second helix assembly 124 mounted on the inside frame 90 on the opposite side of the conveyor trough 108 from the helix assembly 54. Another complete outside helix assembly 126 and outside frame 128 with a support wheel (not shown) cooperates with the second helix assembly 124 to form a second row unit for a two row harvesting head 26. A conveyor belt 79, like the belt 78 is mounted on the outside frame 128. A three row harvesting head would have an outside frame 56 with one helix assembly, two inside frame 90 each having two helix assemblies 54 and 124 and a second outside frame 128 with an outside helix assembly 126. A four row head would add a third inside frame 90 with two helix assemblies 54 and 124.

Drums 130, 132 and 134 are mounted on the front portions of the outside frame 56, the inside frame 90 and the outside frame 128, respectfully. Each of the drums 130, 132 and 134 has a plurality of slots 136. A shaft 138 is journaled in the drum 130 for rotation about an axis that is parallel to the axis of the drum 130 and offset from the axis of the drum toward the passage between the helix assemblies 52 and 54. Fingers 140 secured to the shaft 138 protrude through the slots 136. A hydraulic motor 142 is connected to the shaft 138 and drives the shaft 138. A shaft 144 is journaled in the drum 132 for rotation about an axis that is parallel to the axis drum 132 and offset from the axis of the drum toward the plant passage between the helix assemblies 52 and 54. Another hydraulic motor 142 is connected to and drives the shaft 144. The fingers 140 of the shaft 138 cooperate with the fingers on the shaft 144 and feed the upper portions of plates toward the passage between two adjacent helix assemblies 52 and 54. The drum 132 is oval and has a second shaft 146 that is parallel to the shaft 144. The second shaft 146 is offset toward the plant passage between the helix assemblies 124 and 126. A hydraulic motor 142 drives the second shaft 146. The shaft 148 is journaled in the drum 134 for rotation about an axis that is parallel to the axis of the drum and offset from the axis of the drum toward the plant passage between the helix assemblies 124 and 126. A hydraulic motor 142 drives the shaft 148 and the fingers 140 on the shafts 146 and 148 cooperate to feed the upper portions of plants toward the passage between the helix assemblies 124 and 126.

Snout assemblies 150, 152 and 154 cover the wheels 84, 116 and 118 on the outside frames 56 and 128 and the inside frame 90. These snout assemblies 150, 152 and 154 protect the plants in the rows from the wheels, lift portions of the plants and delivers portion of the plants to the drums 130, 132 and 134 and the fingers 140. Tension spring 156 is attached to an arm 158 clamped to the tool bar 50, and to the outside frame 56. Tension spring 160 has one end attached to an arm 162 clamped to the tool bar 50 and another end attached to the inside frame 90. Tension spring 164 has one end attached to an arm 166 clamped to the tool bar 50 and another end attached to the outside frame 128. These tension springs 156, 160 and 164 reduce the weight supported by the wheels 84, 116 and 118 and assist in lifting the head 26 off the ground when the hydraulic cylinders 48 are extended and the row unit support frame 28 is pivoted upward about pivots 46. Chains 157 are provided to adjust the tension springs 156, 160 and 164. The chains 157 also extend through the springs 156, 160 and 164 to limit spring elongation when the head 26 is lifted from the ground for transport.

Figure 2:
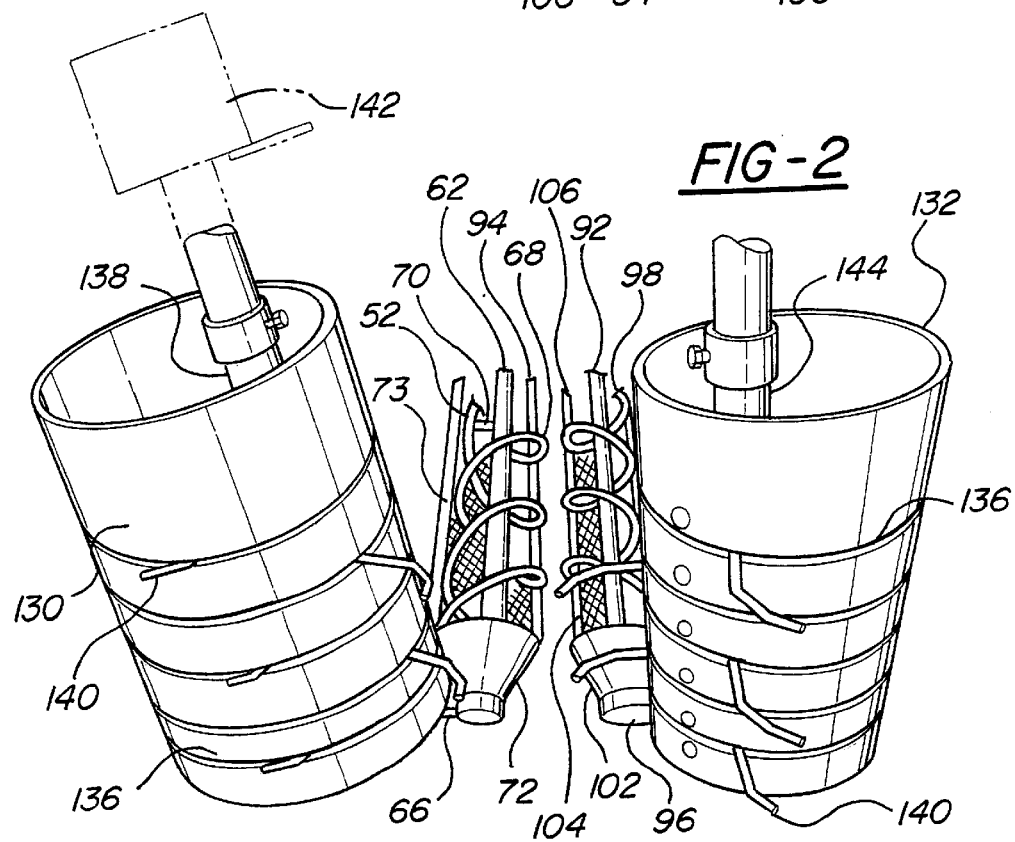
FIG. 2 is a perspective view of the eccentric feed fingers and drums and the front portion of two helix assemblies.
Figure 4:
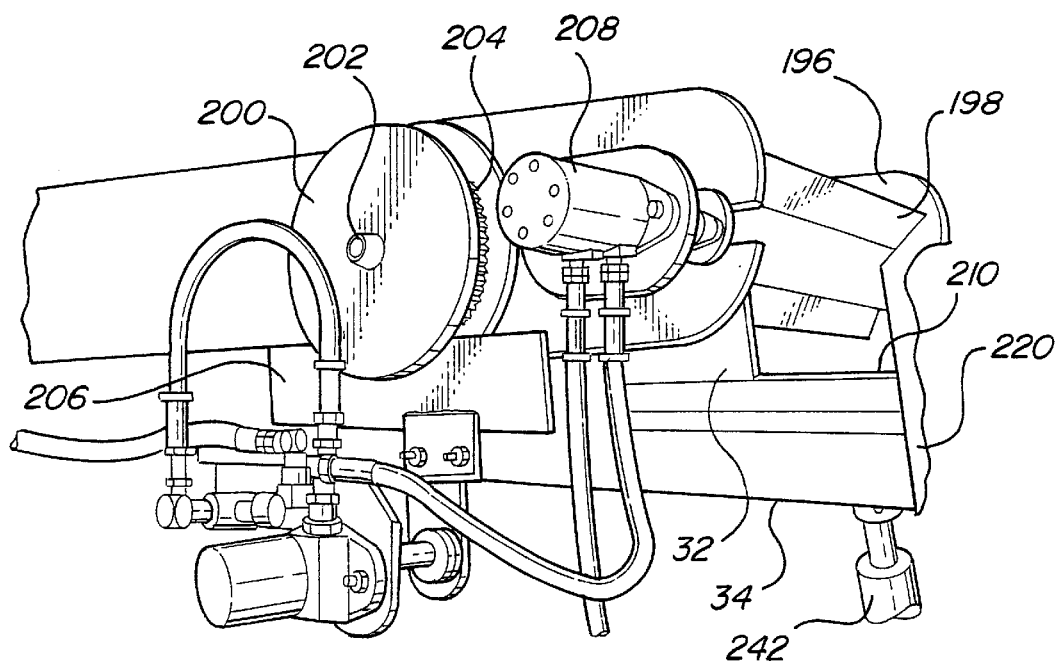
FIG. 4 is a perspective view of the discharge end of the primary elevator conveyor.
Figure 5:
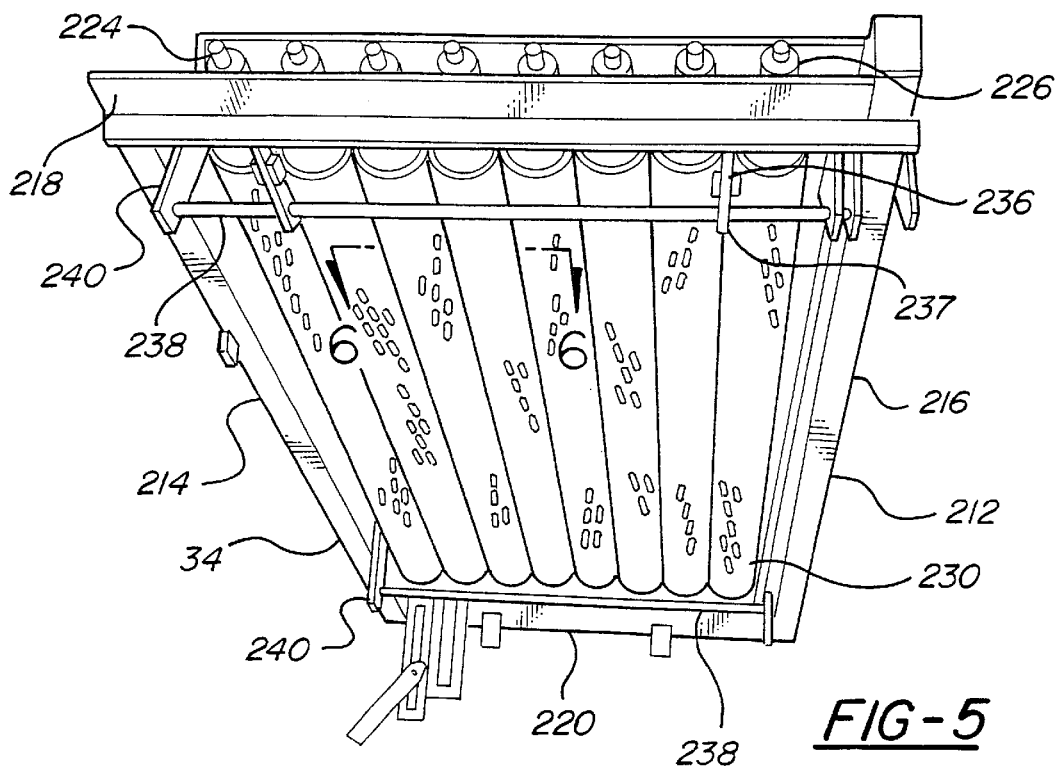
FIG. 5 is a bottom view of the roller bed system, vine and leaf remover.
Figure 8:
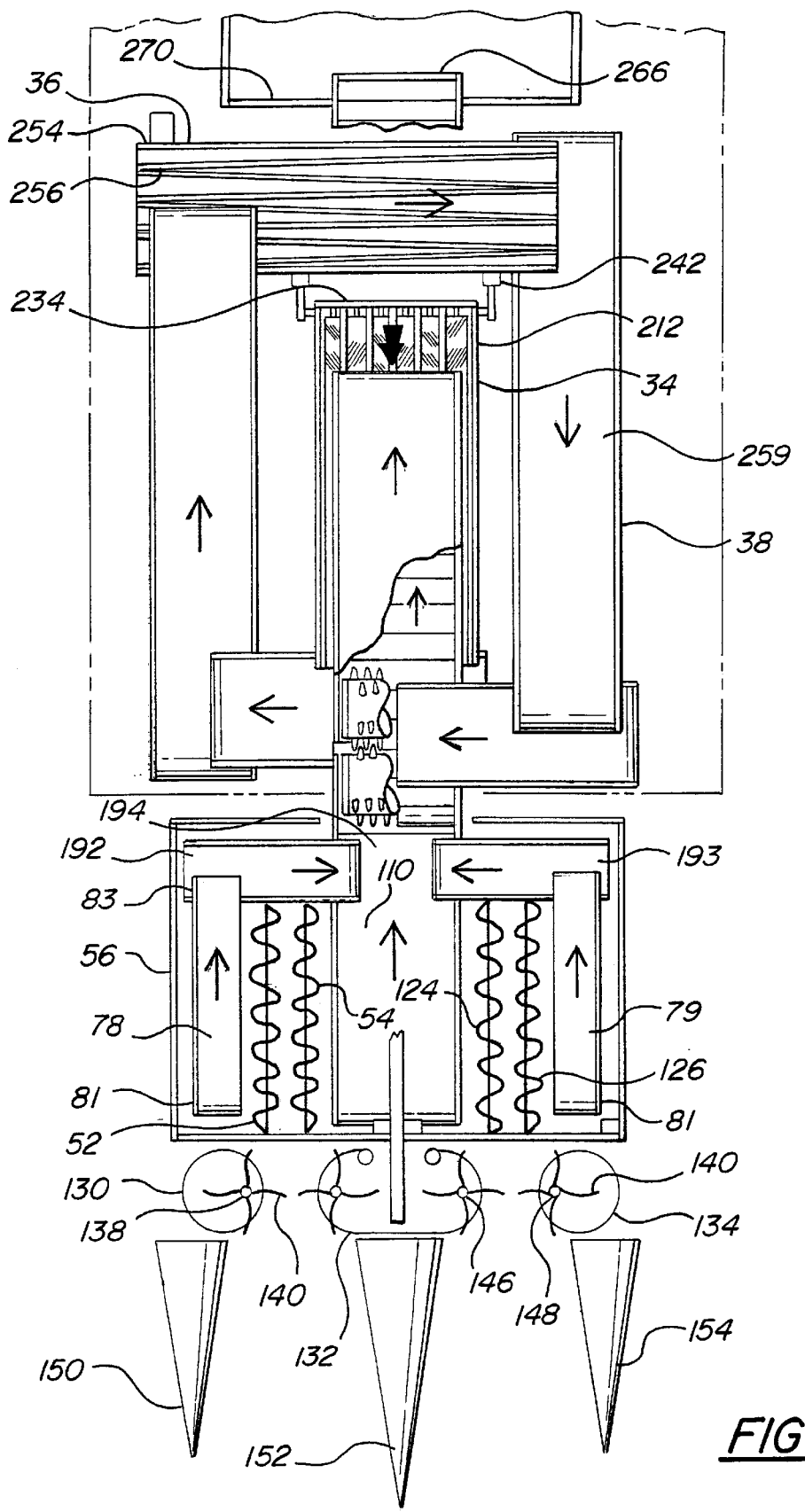
FIG. 8 is a diagrammatic top plan view of the harvester with parts broken away.

The helix assembly 52 is driven in a counterclockwise direction and the helix assembly 54 is drive in a clockwise direction as seen in FIGS. 2 and 3 by a chain 168 that is trained around is sprockets 170, 172 and 174 on central shaft 62, central shaft 92 and a hydraulic motor 176. The chain 168 is also trained around an adjustable idler sprocket 175. The helix assemblies 52 and 54 are timed relative to each other and are driven so that they tend to lift peppers up and away from the plant. The chain 168 accommodates some misalignment between the center shafts 62 and 92 that occurs when the helix assemblies 52 and 54, move up and down relative to each other. Adjustments 177 allow the upper ends of the helix assemblies 52 and 54 to be positioned closer together or farther apart. The helix assemblies 124 and 126 have a separate drive. The helix shaped rods 68 and 98 lift peppers up and outward with some force. The helix assemblies 52, 54, 124 and 126 are therefore enclosed by expanded metal side panels 178, top panels 180 and front panels 182 that do not interfere with entry of plants into the harvester 10. These panels 178, 180 and 182 keep peppers from being thrown out onto the ground. The top panels 180 are hinged and can be opened as required for inspection and repair of the helix assemblies. The panel 180 in FIG. 3 is in an open position.

The harvesting head 26 is constructed to accommodate the farming practices employed. The head 26 shown in the drawing was constructed to harvest peppers planted in two spaced part rows on a raised bed with irrigation ditches on both side of the bed that are about eight inches deep. The irrigation ditches make it desirable for the helix assemblies 52 and 126 on the outside frames 56 and 128 to be lower than the helix assemblies 52 and 54 on the center portion of the raised bed to prevent the loss of some peppers. The conveyor trough 76 and the conveyor belt 78 are lower relative to the helix assembly 52 as indicated by the plate 82 then the conveyor belt 110 relative to the helix assembly 54 as indicated by the smaller plate 114.

A bar 184 is pivotally attached to the outside frame 56 and to the inside frame 90 by bolts 186. A bar 188 is pivotally attached to the front of the inside frame 90 and the outside frame 128 by bolts 190. These bars 184 and 188 allow limited pivoted movement of one frame member 56, 90 or 128 relative to an adjacent frame member 56, 90 or 128. However, the bars 184 and 188 also limit movement of the frame members 56, 90 and 128 relative to each other to prevent damage to the helix assembly drives and other parts.

Peppers and other materials severed by the helix assemblies 52, 54, 124 and,126 fall onto the belt conveyors 78, 79 and 110 which convey them up and to the rear. Transverse conveyors 192 and 193 received peppers and other plant material from the belt conveyors 78 and 79 and possibly other belt conveyors depending upon the number of rows the head 26 harvests simultaneously. Transverse belt conveyors 78 and 79 and one conveyor belt 110, if the head harvests an even number of rows of plants, deposits peppers and other plant material on a head discharge conveyor 194. The discharge conveyor 194 discharges peppers to the rear and onto the primary elevator 30.

The primary elevator 30 has an elevator trough 196 and a belt conveyor 198 trained around a lower roller 408 and an upper roller. The lower end of the trough 196 is pivotally secured to the main frame 12 by trunions 404 between front wheels 14 for pivotal movement about a transverse horizontal axis. A pair of rollers 200 are rotatably journaled on a shaft 202 passing through the upper end of the trough 196. A rubber belting band 204 on each roller 200 is supported by tracks 206. The belt conveyor 198 is driven by a hydraulic motor 208 connected to the upper roller.

A pan 210 encloses the bottom of the trough 196. A fan forces air into the passage formed by the pan 210 and the trough 196. This air is discharged under the discharge end of the primary elevator 30 and separates loose leaves and other plant material from peppers discharged from the primary elevator. The light plant material is directed toward the ground immediately forward of the rear axle 18 and between the rear wheels 16.

Peppers, heavy plant material and plant material attached to the peppers falls through the stream of air and onto the roller bed 34. The frame 212 of the roller bed 34 has side members 214 and 216, a lower cross bar 218 and an upper cross bar 220. Eight steel rollers 222 with central shafts 224 are journaled on the crossbars 218 and 220 by bearings 226. The number of rollers 222 can be increased or decreased as required. A rubber belting cover 228 with a rough outer surface formed by raised projections 230 are secured to the steel rollers 222. The covers 228 contact the covers on adjacent rollers 222. The rollers 222 are driven by a hydraulic motor 219 and a belt 223 trained around pulleys 225 to drive one roller 222 in a given direction and drive adjacent rollers in an opposite direction.

Rods 232 are supported above the nips of the rollers 222 by an adjustable linkage assembly. The linkage includes a bar 234 at each end of the rods 232 which is welded to each of the rods. Two links 236 are rigidly attached to each bar 234 and extend down between the shafts 224 of the rollers 222. Arms 237 on the shaft 238 journaled in brackets 240 welded to the side members 214 and 216 are pivotally attached to the links 236. Rotation of the shafts 238 raise or lower the rods 232 relative to the nips of the rolls 222. The shafts 238 are preferably connected to a linkage 221 that insures that the rods 232 remain parallel to the rollers 222.

The lower forward end of the side members 214 and 216 are pivotally attached to the main frame 12 by brackets 217 slightly to the rear of the front wheels 14. The upper rear end of the side members 214 and 216 are supported by hydraulic cylinders 242 attached to the main frame 12 above the rear axle 18.

The hydraulic cylinders 242 are extended and retracted to increase and decrease the slope of the rollers 222 and to change the time required for peppers to move along the length of the rollers. The tracks 206 are mounted on the side members 214 and 216 and raise and lower the discharge end of the primary elevator 30 when the cylinders 242 are extended and retracted.

The primary elevator discharges peppers onto the upper ends of the rollers 222 near the upper cross bar 220. As the peppers move parallel to the axis of rotation of each roller 222, the rough surface of the cover 228 of the rollers 222 pull leaves, vines and stems into the roller nips. Once these materials are pulled into the nips between adjacent rollers 222, the rollers pull the materials from the peppers and discharge them to the ground below the roller bed 34. The rods 232 are adjustable up and down as required to accommodate the size of the peppers being harvested and to adjust the aggressiveness with which stems are pulled from the peppers. Long stems and vines may wrap around the rollers 222. To reduce this wrapping problem, the hydraulic motor which drives the rollers 222 is reversible. The rollers 222 pull stems, leaves and other material into the nips, separate these materials from the peppers and discharge them with the rollers driven in either direction.

Figure 12:
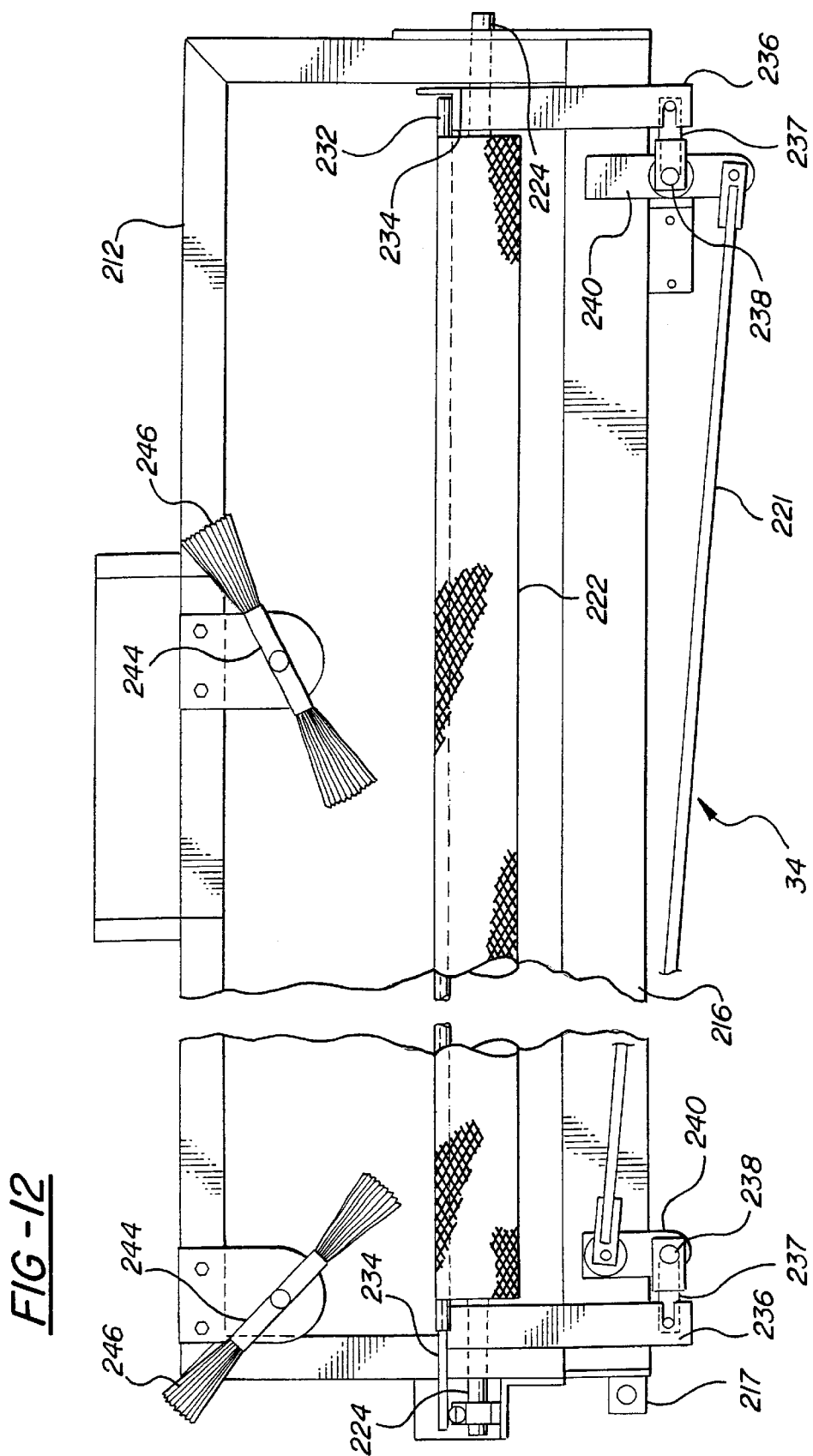
FIG. 12 is a side elevational view of a modified roller bed with parts broken away.

A beater 244 with two sets of bristles 246 is mounted above the lower discharge end of the roller bed 34. The beater 244 is driven so that the bristles sweep peppers from the roller bed 234 and into a transverse conveyor 248. A modified roller bed 34 is shown in FIG. 12. The modified roller bed 34 includes a second beater 244. The second beater 244 is mounted near the upper end of the roller bed 34 and just below the area where the peppers are deposited on the roller bed. The purpose of the second beater 244 is to help control the rate of movement of the peppers along the length of the rollers 222. In the morning when the plants are wet with dew they tend to move slowly. In the afternoon when the plants are dry they tend to move rapidly. The transverse conveyor 248 receives the peppers and conveys them to an elevator 250 with buckets 252 on the right side of the machine. The elevator 250 elevates the peppers and moves them toward the rear of the harvester where they are deposited on a sizer 36 or 500.

The sizer 36 has a frame 254 that carries a plurality of bars 256. The bars 256 are in a slight fan shape with increased space between them at the discharge end. One end of the frame 254 is mounted on a horizontal crank shaft. The other end of the frame 254 is carried by rollers supported by a track 258. The sizer 36 allows foreign objects to fall from the peppers to the ground. The bars 256 of the sizer 36 also allows small immature peppers to pass between adjacent bars and fall to the ground in front of the rear axle. Mature peppers are delivered to a sorting bed 38 by the sizer 36.

The sorting bed 38 has a horizontal belt conveyor 259 that conveys peppers forward on the left side of the machine. Several individuals stand on the platform next to the sorting bed 38 and remove peppers that have been damaged or that are undesirable due to color or for some other reason. A cross conveyor 260 behind the operator's cab 24 delivers the cleaned and sorted peppers to the elevator 262. The elevator 262 includes an elevator trough 264 with a conveyor belt 266 trained around upper and lower rollers and driven by a hydraulic motor 268. The lower end of the elevator is pivotally attached to the main frame 12 adjacent to the rear of operator's cab 224. The rear portion of the elevator trough 264 is supported above the upper edge of the front wall 270 of the storage bin 40. During transport or storage of the harvester 10, a door 272 in the front wall 270 of the storage bin 40 is removed and the elevator trough 264 is pivoted down into the opening to decrease the height of the harvester. During operation of the harvester 10 in the field, the elevator 262 delivers cleaned and sorted peppers to the storage bin 40.

Storage bin 40 is emptied from discharge conveyor system 42. The system 42 includes a transverse generally horizontal belt conveyor 274 that forms a portion of the floor of the storage bin 40. The conveyor 274 discharges peppers from the right side of the bin 40 and deposits them on a belt conveyor 276. The belt conveyor 276 conveys the peppers towards the front of the harvester and to a bucket elevator 278. The bucket elevator 278 receives peppers from the belt conveyor 276, elevates the peppers and discharges them from the right side of the harvester 10. A hydraulic cylinder 280 pivots the bucket elevator 278 about a lower end pivot between a raised transport position and a lowered discharge position If desired, the bucket elevator 278 can be mounted on the frame to receive peppers directly from the belt conveyor 274 and the conveyor 276 can be eliminated.

During harvesting operations, the hydraulically driven wheels 14 and 16 propel the harvester 10 forward in a direction parallel to the rows of growing peppers. The snout assemblies 150, 152 and 154 divide and lift plants and the fingers 140.feed them into the helix assemblies 52, 54, 124 and 126. The helical shaped rods 68 and 98 lift the peppers and separate them from the plants. Belt conveyors 78 and 110 received the peppers and deliver them to a primary elevator 30. The primary elevator discharges the peppers into a stream of air. The peppers fall onto the roller bed 34 after passing through the stream of air that removes loose light materials.

The roller bed 34 removes stems, vines and leaves from the peppers and discharges the removed material from the harvester. The peppers are then conveyed to the sizer 36 that removes small immature peppers and delivers mature peppers to the sorting bed 38. Peppers are sorted by hand on the sorting bed 38 to remove damaged peppers and peppers that are undesirable for any reason. Following sorting, the peppers are accumulated in the storage bin 40 and then discharged from the harvester 10 for transport to market.

Figure 9:
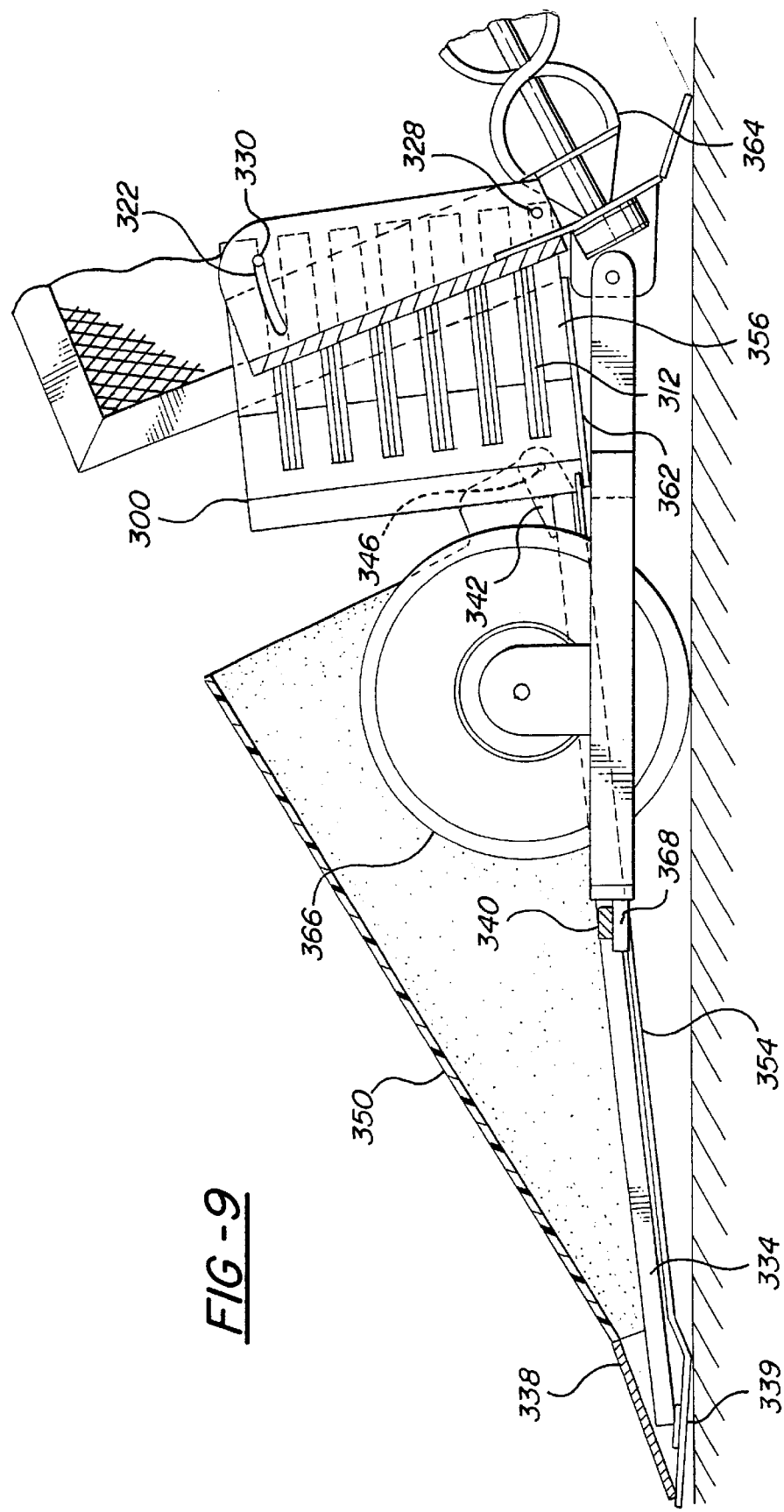
FIG. 9 is a side elevational view of a modified snout assembly and plant feed assembly.
Figure 10:
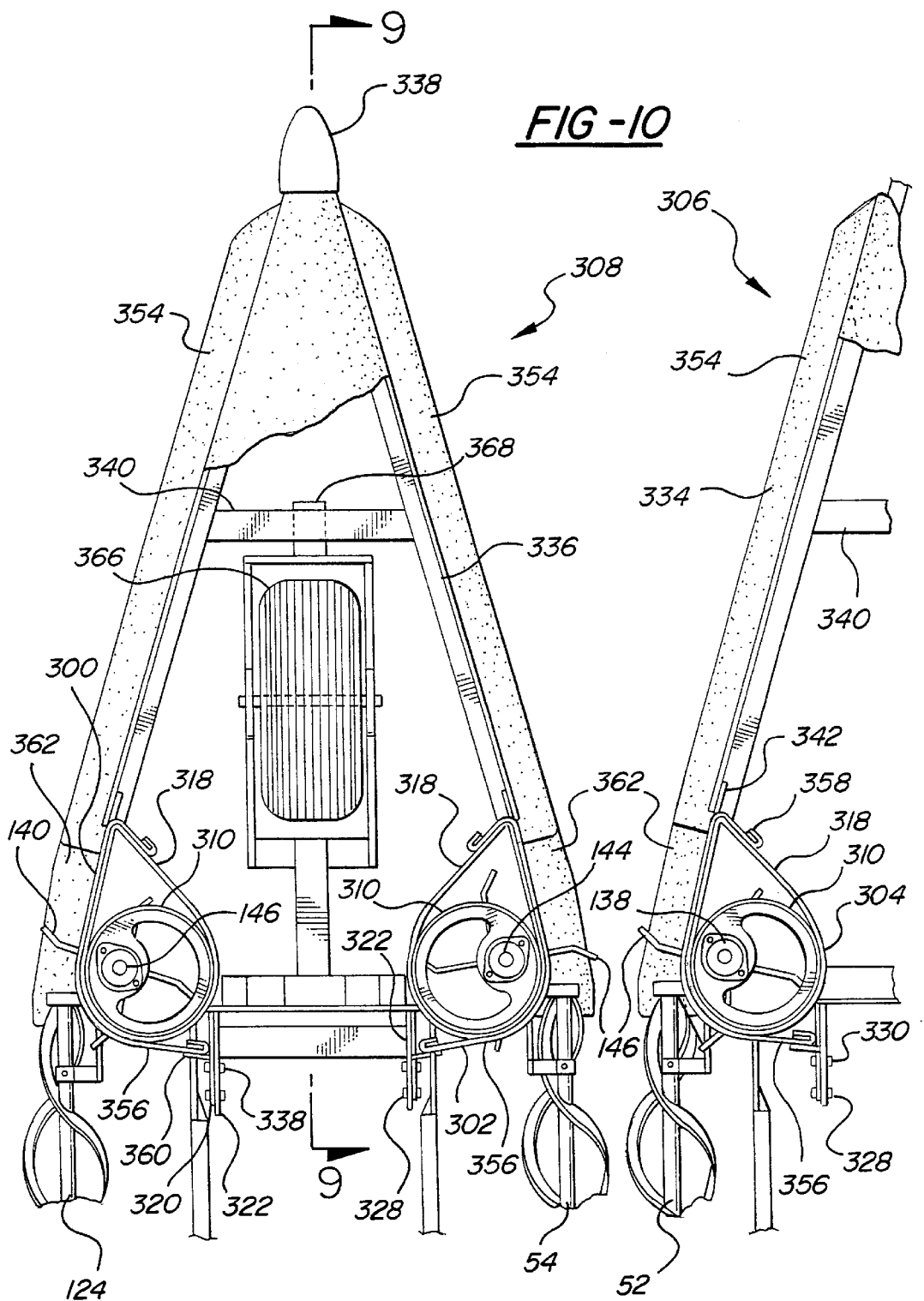
FIG. 10 is a plan view of modified snout assemblies and plant feed assemblies with parts broken away.
Figure 11:
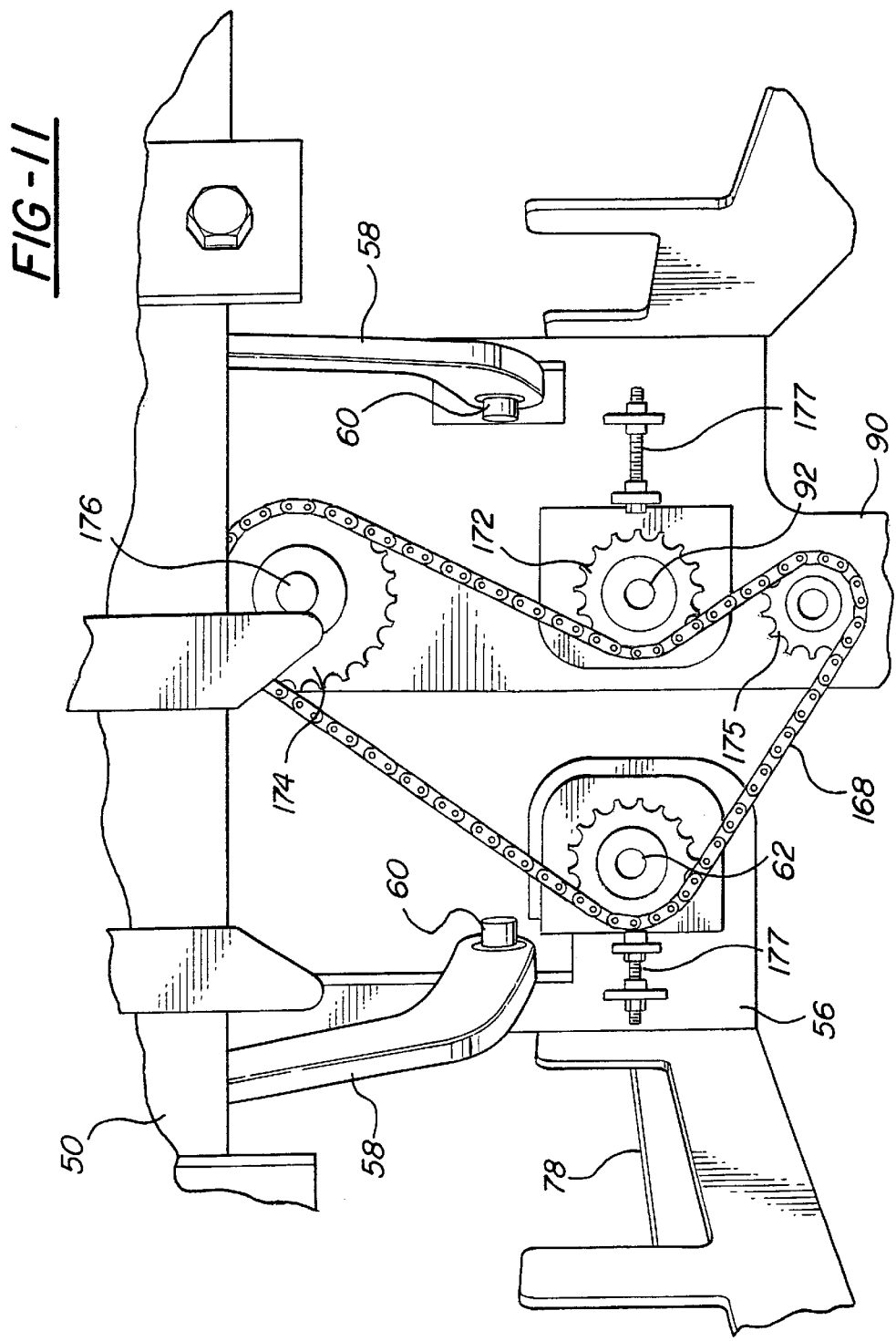
FIG. 11 is a perspective view of the drive for helix assembling.

Plant feed assemblies 300, 302 and 304 and snout assemblies 306 and 308 shown in FIGS. 9 and 10 are improved designs from those shown in FIGS. 1, 2, 7 and 8 as described above. Each plant feed assembly, 300, 302 and 304 includes a cylindrical member 310 with slots 312 that are perpendicular to a central axis of the cylindrical member. A shaft 314 journaled inside each cylindrical member 310 for rotation about an axis that is parallel to an offset from the central axis of the cylindrical member. Fingers attached to the shaft 314 extend through the slots 312 and their tips follow a circular path 316 when the shaft is driven by a hydraulic motor 142 as described above. These cylindrical members 310 are identical to the drums 130 and 134 described above.

A V-shaped member 318 is welded to each cylindrical member 310 to form a teardrop shaped housing. The slots 312 also pass through a portion of the V-shaped member 318 that is within the circle defined by the circular path 316.

A mounting plate 320 is welded to each cylindrical member 310 and abuts against a support plate 322 on an outside frame 324 or an inside frame 326. The mounting plates 320 are pivotally attached to the support plates 322 by a bolt 328 shown in FIG. 9. A second bolt 330 passes through a hole in the support plate 322 and a slot 332 in an upper portion of the mounting plate 320. The slot 332 makes it possible to adjust the plant feed assemblies 300, 302 and 304 to positions in which the fingers 140 on the shafts 314 move plant material horizontally to the rear or to positions in which the fingers lift plant material at the same time they move plant material to the rear relative to the outside frame 324 and the inside frame 326. The slots 332 permit adjustment of the distance the fingers 140 lift crop material.

The snout assemblies 306 and 308 include structural angle members 334 and 336, a metal tip 338 with a skid plate 339 and a cross beam 340. The rear ends 342 and 344 of the snout assemblies 308 are pivotally attached to two adjacent plant feed assembly V-shaped members 318 by bolts 346 that permit the tip 338 to move up and down. The snout assemblies 306 on outside frames 324 have their outside angle member 348 modified, to reduce snout assembly width, and pivotally attached to the outside frame.

A plastic member 350 is inserted into the rear portion of each tip 338 and secured to the angle arm members 334 and 336 of each snout assembly 306 and 308. Horizontal plastic ledges 354 extend horizontally outward from the lower edges of the plastic members 350. Plastic covers 356 are attached to the plant contact surfaces of each plant feed assembly 300, 302 and 304 by holders 358 and 360. A horizontal plastic ledge 362 extend horizontally outward from the lower edge of each plastic cover 356 and is positioned slightly below the horizontal plastic ledge 354. The horizontal ledges 354 and 362 move under low branches of plants and lift these branches and any attached fruit ahead of the helix assemblies 364. The horizontal ledges 354 and 362 also catch some fruit that falls from the plants and carries the loose fruit up to the helix assemblies 364.

Extending the hydraulic cylinders 48, to lift the harvesting head 26, lifts the support wheels 366. As the support wheels 366 rise off the ground, the tongue member 368 contacts the cross beam 340 and lifts the snout assemblies 306 and 308 If desired, adjustable stops can be provided on the tongue members 368. The adjustable stops can be adjusted to let the skid plate 339 contact the ground on level terrain or to support the snout assemblies 306 and 308 slightly above the ground.

Figure 13:
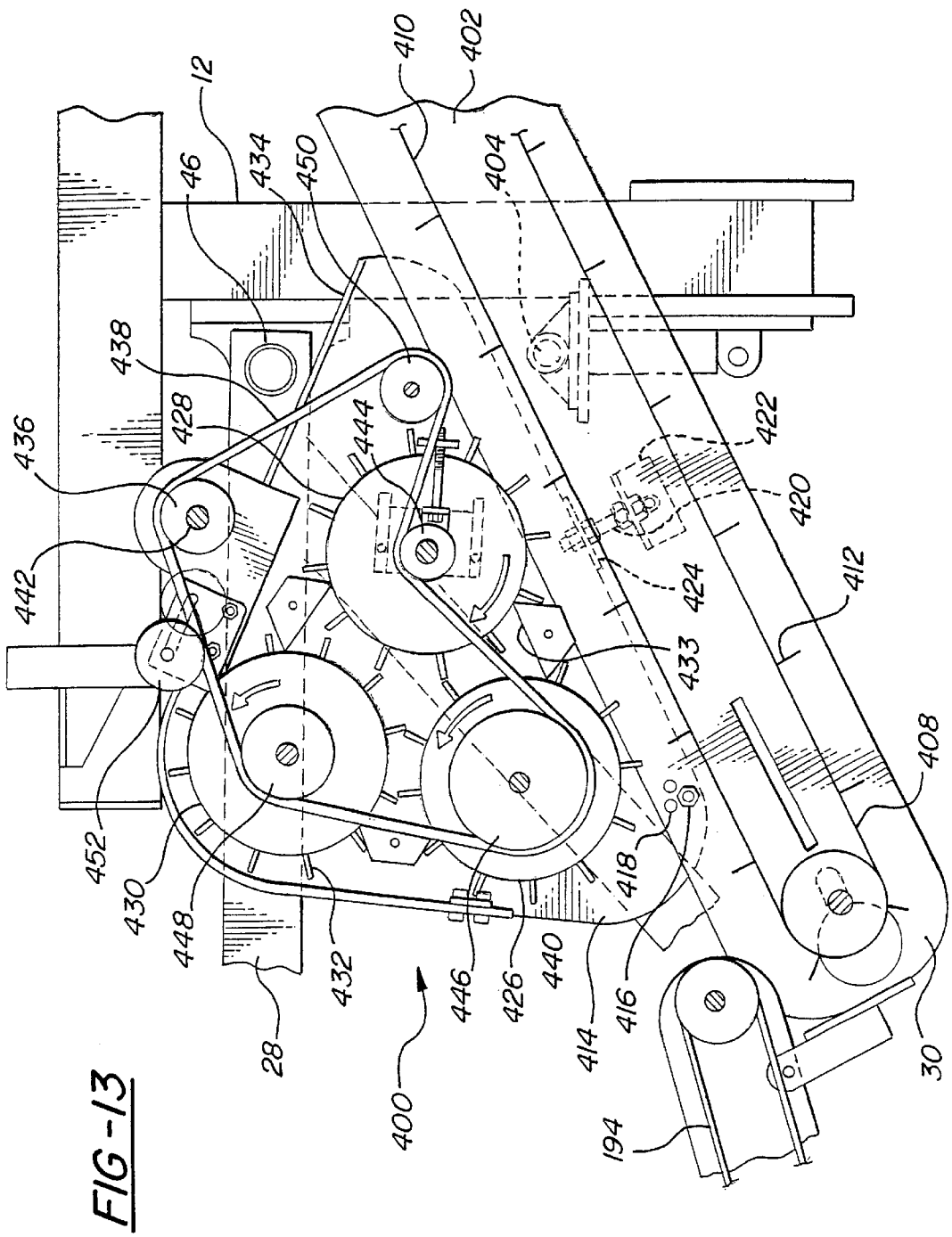
FIG. 13 is a side elevational view of the shredder with one side plate removed.

A shredder 400 shown in FIG. 13, for shredding plant stems and leaves that are broken from plants at times along with the fruit, can be mounted on the lower end of the primary elevator 30. As shown in FIG. 13, the primary elevator 30 is a belt conveyor with two spaced apart side frames 402 that are pivotally attached to the main frame 12 by trunions 404 for pivotal movement about a horizontal, transverse axis, as explained above. An idler roller 408 is journaled on the lower end of the side frames 402. An endless conveyor belt 410, with integral upright paddles 412, is trained around the idler roller 408 and a driven upper roller.

The shredder 400 has two side plates 414 that extend down over the outside of the conveyor side frames 402 and are pivotally attached to the side frames 402 by a pair of bolts 416. A plurality of holes 418 are provided in the side frames 402 for the bolts 416 to adjust the height of the side plates 414 relative to the conveyor belt 410 and paddles 412. If needed, a plurality of holes (not shown) can also be provided in the side plates 414 to increase the range of vertical adjustment of the shredder. An adjustment bolt 420 is attached to each side frame 402 and the adjacent shredder side plate 414 to pivot the side plates about the bolts 416 to further adjust the vertical position of the shredder 400. The adjustment bolts 420 pass through angle irons 422 attached to the side frames 402, and through plates 424 secured to the side plates 414.

A first drum 426 is journaled on the side plates 414 for rotation about a horizontal axis. A second drum 428 is journaled on the side plates 414 for rotation about an axis that is parallel to and spaced to the rear of the axis of the first drum 426. A third drum 430 is journaled on the side plates 414 for rotation about an axis that is parallel to the axis of the first drum 426, horizontally positioned between the axis of the first drum and the axis of the second drum 428, and vertically positioned above the axis of the first drum and the axis of the second drum.

A plurality of fingers 432 project radially from the outer surface of the first, second, and third drums 426, 428, and 430. These fingers 432 on each drum 426, 428, and 430 project between the fingers on the other two drums. Because of the axial spacing of the fingers 432, along the axis of each drum 426, 428, and 430, the fingers do not contact each other. The second drum 428 is adjustably mounted on the side plates 414 for adjustment toward and away from the first drum 426 and the third drum 430. The fingers 432 can be steel or strong plastic material. An opening 433 is provided in each side plate 414 for inspection of the fingers 432. A hood 434 covers the top and the front of the drums 426, 428, and 430, to confine crop material that is being shred by the fingers 432.

The drums 426, 428, and 430 are driven by a drive sprocket 436 and an endless belt 438 in the directions indicated by arrows 440. The drive sprocket 436 is mounted on the output shaft 442 of a hydraulic motor. The endless belt 438 is preferably a chain that is trained around driven sprockets 444, 446, and 448. The endless belt 438 is also trained around a fixed idler sprocket 450 and an adjustable sprocket 452. The adjustable sprocket 452 controls the tension in the endless belt 438. The first drum 426 runs at a slower speed than the other drums of the shredder 400. The second drum 428 runs at a faster speed than the other shredder drums 426 and 430. The third drum 430 is driven at an intermediate speed.

During operation of the shredder, the fingers 432 on the first drum 426 and the second drum 428 pick up stems and leaves of crop plants that project up above the paddles 412 of the conveyor belt 410. Some of the stems are shredded by the fingers 432 as they pass between the first and second drums 426 and 428 because the fingers on the second drum are traveling at a higher speed than the fingers on the first drum. The stems and other crop material are conveyed toward the third drum 430 by the first drum 426 and the second drum 428. The crop material then passes between the third drum 430 and the second drum 428. Additional shredding occurs during this passage because the fingers 432 on the second drum 428 are traveling faster than the fingers on the third drum 430. The second drum 428 returns shredded material to the conveyor belt 410.

Fruit attached to the stems that enter the shredder 400 pass between the fingers 432 and between the first, second, and third drums 426, 428, and 430. Stems and leaves attached to fruit are shredded, and then the fruit and the shredded stems are returned to the primary elevator 30.

Figure 14:
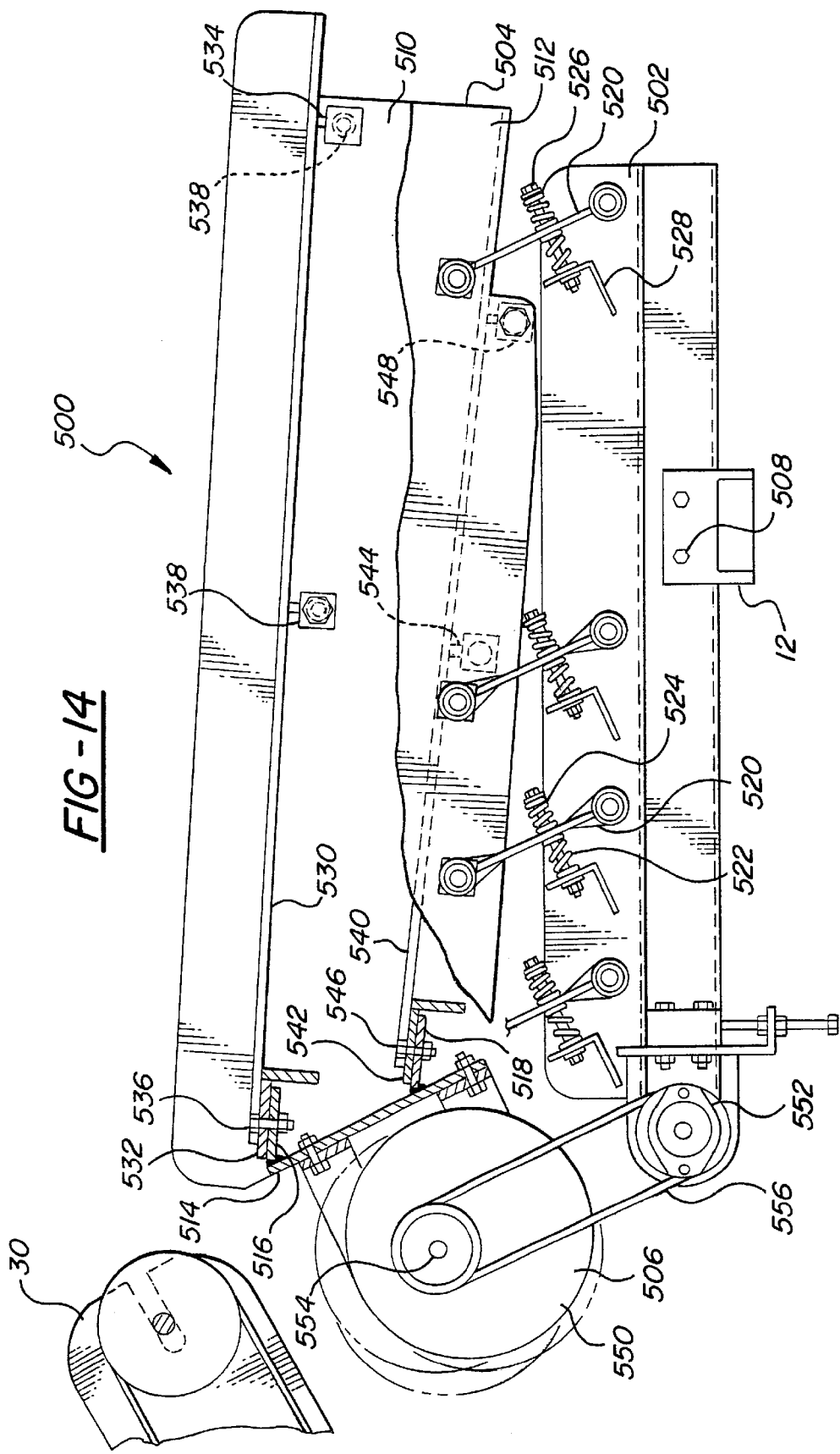
FIG. 14 is a side elevational view of the fruit sizer with parts broken away.
Figure 15:
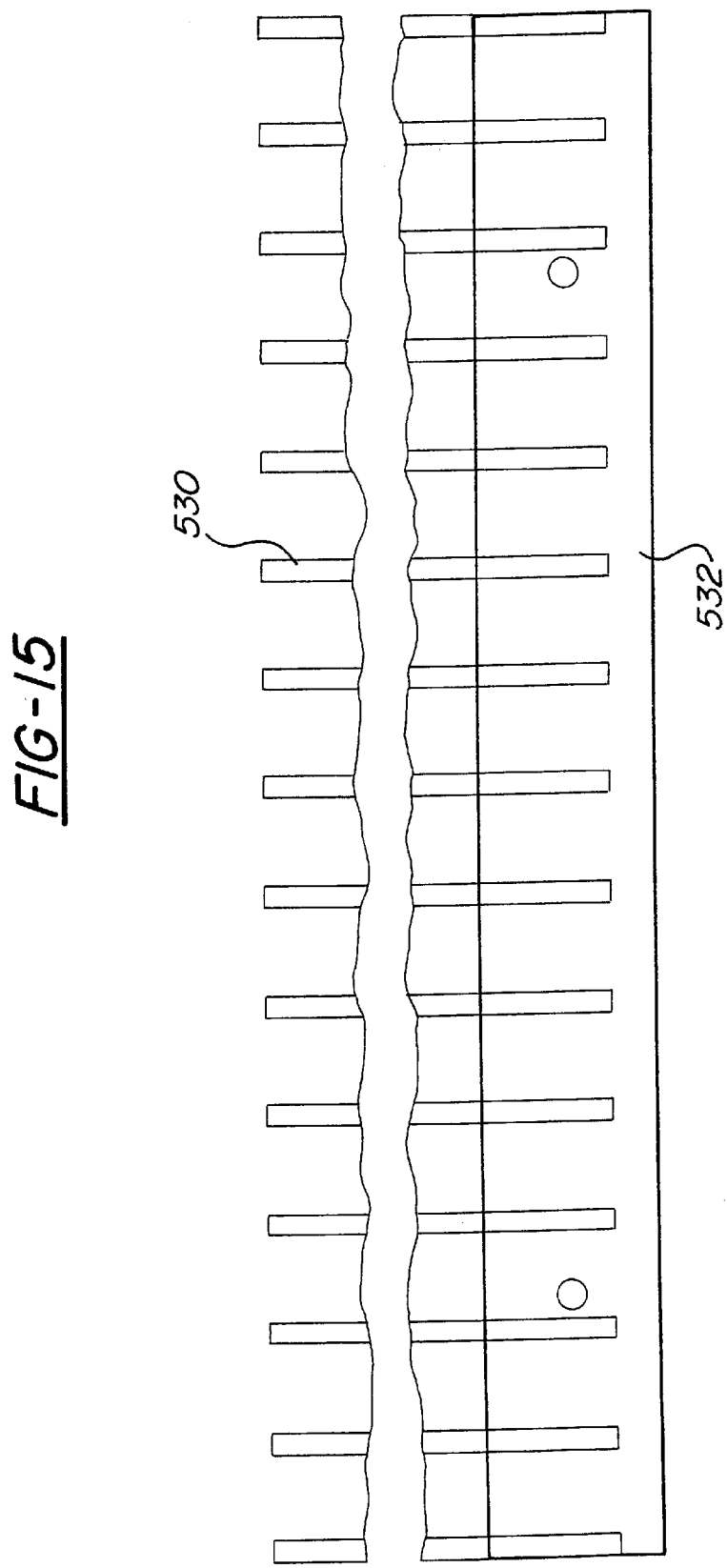
FIG. 15 is a plan view of one of the sizing bar assemblies.
Figure 16:
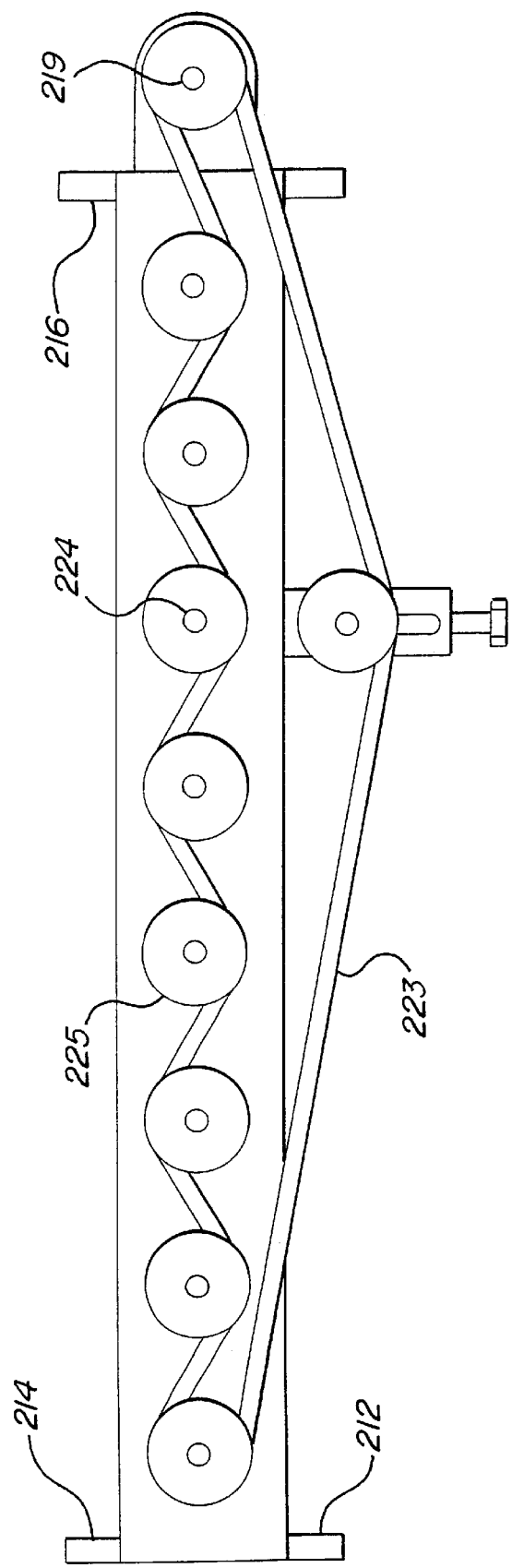
FIG. 16 is an elevational view of the roller bed drive.

The sizer 500, as shown in FIGS. 14 and 15, has a base 502, a frame 504, and a vibrator 506. The base 502 is attached to the frame 12 of the harvester 10 by bolts 508. The frame 504 includes two side plates 510 and 512, an end plate 514 welded to both side plates, and cross members 516 and 518. A plurality of arms 520 are pivotally attached to the base 502 and the frame 504. Damper springs 522 and 524, on bolts 526 that pass through brackets 528 on the base 502, dampen movement of the frame 504 in both directions.

A plurality of parallel, upper sizing bars 530 are secured to an end cross member 532 and intermediate cross members 534. The sizing bars 530 are rectangular tubes. The end cross bar 532 is attached to the cross member 516 by bolts 536. The intermediate cross bars 534 are secured to the two side plates 510 and 512 by mechanical fasteners 538. The sizing bars 530 are spaced apart a distance sufficient to allow all but the largest fruit to pass between two adjacent sizing bars. The fruit that does not pass through the sizing bars 530 is generally connected to large stems that were not removed prior to reaching the sizer 500. Large material that fails to pass between the adjacent sizing bars 530 is generally discharged from the machine. A set of upper sizing bars 530, with a different bar spacing, can replace upper sizing bars in the sizer 500, if a different spacing is needed.

A plurality of parallel lower sizing bars 540 are secured to an end cross bar 542 and intermediate cross bars 544. The lower sizing bars 540 are rectangular tubes. The end cross bar 542 is attached to the cross member 518 by bolts 546. The intermediate cross bars 544 are secured to the two side plates 510 by mechanical fasteners 548. The lower sizing bars 540 are spaced apart a distance required to let fruit that is too small pass through and fall to the ground. Fruit that is a usable size is discharged from the discharge end of the lower sizing bars 540. The usable fruit generally falls directly onto a sorting bed 259 for hand sorting. If hand sorting is not required, the sized fruit can go directly to the storage bin 40.

A vibrator 506 has a housing 550 that houses an eccentrically mounted weight (not shown). A hydraulic motor 552 drives an input shaft 554 through an endless belt 556. The input shaft 554 rotates the eccentric weight inside the housing 550 of the vibrator 506, and shakes the frame 504 back and forth. This vibration tends to move fruit, from the end of the sizing bars 530 and 540 adjacent to the end plate 514, toward their discharge ends. The damper springs dampen the vibration and enhance fruit conveying.

Peppers and other fruit that can be harvested by the harvesting machine 10, grow in a variety of sizes and shapes. These fruits are sometimes harvested when they are green. At other times, these fruits are allowed to dry and are then harvested. These variations in the fruit being harvested, and in the harvesting conditions, may change harvester requirements substantially.

The shredder 400 may not be needed in some conditions. A longer roller bed 34 may be required, or it may be necessary to employ two roller beds in series when there is excessive crop material other than fruit. A roller bed 34 can not be used to separate the stems and leaves when harvesting most dried peppers. Also when harvesting dried fruit, more fans may be required. The sizer 500 and the sorting bed 38 may not be required for some crops.

The cleaning, sizing, and sorting assemblies described above can be switched around to change the sequence of cleaning, sizing, and sorting. The capacity for cleaning, sizing, and sorting can be increased, decreased, or even eliminated to meet different and changing requirements.

The disclosed embodiments are representative of presently preferred forms of the invention, but are intended to be illustrative rather than definitive thereof. The invention is defined in the claims.

I claim:

1. An agricultural harvester roller bed comprising a roller bed frame, a plurality of parallel rollers journaled on the roller bed frame adjacent to each other, a roller nip between each pair of adjacent rollers of the plurality of parallel rollers, a bar supported by the roller bed frame directly above each of the roller nips in a position parallel to the roller nip, and a reversible drive that drives the rollers of each pair of adjacent rollers in opposite directions, and wherein the plurality of parallel rollers grasp straw and leaves and discharge the straw and leaves below the plurality of parallel rollers while leaving fruit above the plurality of rollers.

2. An agricultural harvester roller bed as set forth in claim 1 including at least one beater with bristles journaled on the roller bed frame for rotation about an axis transverse to the plurality of parallel rollers; and a beater drive for rotating the beater and moving fruit parallel to the plurality of parallel rollers.

3. An agricultural harvester roller bed as set forth in claim 1 wherein the bars supported by the roller bed frame above the roller nips are vertically adjustable to accommodate fruit of different sizes.

4. An agricultural harvester roller bed as set forth in claim 1 wherein the roller bed frame has a first end that is pivotally attached to a harvester frame and a second end that is supported by the harvester frame and is vertically adjustable relative to the harvester frame to control the rate of movement of fruit along the length of said plurality of parallel rollers.

5. An agricultural harvester roller bed as set forth in claim 4 wherein the second end of the roller bed frame is connected to the harvester frame by at least one linear actuator.

6. An agricultural harvester roller bed as set forth in claim 5 including a conveyor for delivering fruit to the roller bed that is pivotally attached to the harvester frame and a track and roller supporting a delivery end of the conveyor on the roller bed frame and accommodating vertical adjustment of the second end of the roller bed.

7. An agricultural harvester roller bed as set forth in claim 1 wherein the plurality of parallel rollers are metal cylinders covered by a resilient material cover.

\* \* \* \* \*